United States Patent [19]

Nagel

[11] Patent Number: 4,468,138
[45] Date of Patent: Aug. 28, 1984

[54] MANUFACTURE OF DIAMOND BEARINGS

[75] Inventor: Dave D. Nagel, Houston, Tex.

[73] Assignee: Maurer Engineering Inc., Houston, Tex.

[21] Appl. No.: 306,544

[22] Filed: Sep. 28, 1981

[51] Int. Cl.³ .................... F16C 17/02; F16C 33/26
[52] U.S. Cl. ........................ 384/303; 308/DIG. 8; 228/122; 228/185
[58] Field of Search ................ 228/185, 122, 124; 156/297; 29/149.5 R; 308/DIG. 8; 384/282, 308, 303

[56] References Cited

U.S. PATENT DOCUMENTS

| T102,901 | 4/1983 | Offenbacher | 29/149.5 R |
| 947,242 | 1/1910 | Kingsbury | 384/308 |
| 1,925,460 | 9/1933 | Pegram | 156/297 |
| 2,265,065 | 12/1941 | Daywalt et al. | 384/282 |
| 4,109,737 | 8/1978 | Bovenkerk | 175/329 |
| 4,277,869 | 7/1981 | Hartwell | 384/282 X |
| 4,345,798 | 8/1982 | Cortès | 384/125 |

FOREIGN PATENT DOCUMENTS 627259 10/1978 U.S.S.R. .................. 384/308

OTHER PUBLICATIONS

Mehan et al., "Friction & Wear of Diamond Materials and other Ceramics Against Metal", Report No. 80CRD217, General Electric; Schenectady, N.Y.; Sep. 1980.

Primary Examiner—Kenneth J. Ramsey
Attorney, Agent, or Firm—Neal J. Mosely

[57] ABSTRACT

In the manufacture of diamond bearings consisting of a supporting plate/ring having a plurality of recesses equally spaced therearound with insert members consisting of hardmetal or carbide studs, with planar faces of polycrystalline diamond, positioned therein, the diamond bearing faces are made co-planar by placing metal pads, preferably of brazing metal, in the bottom of each recess before insertion of the bearing studs, placing the assembly with the bearing faces on a smooth planar support, heating the assembly to a temperature at which the metal pads soften or melt and allowing the metal pads to extrude around and braze the bearing inserts in place. When the assembly has cooled, the bearing inserts have their diamond bearing faces locked in co-planar relation by the extruded metal from the metal pads.

11 Claims, 5 Drawing Figures

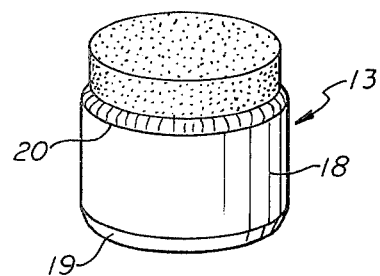
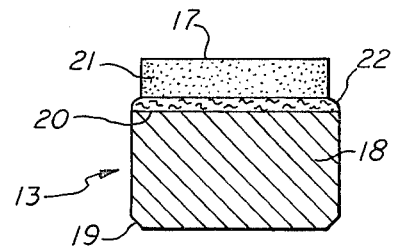
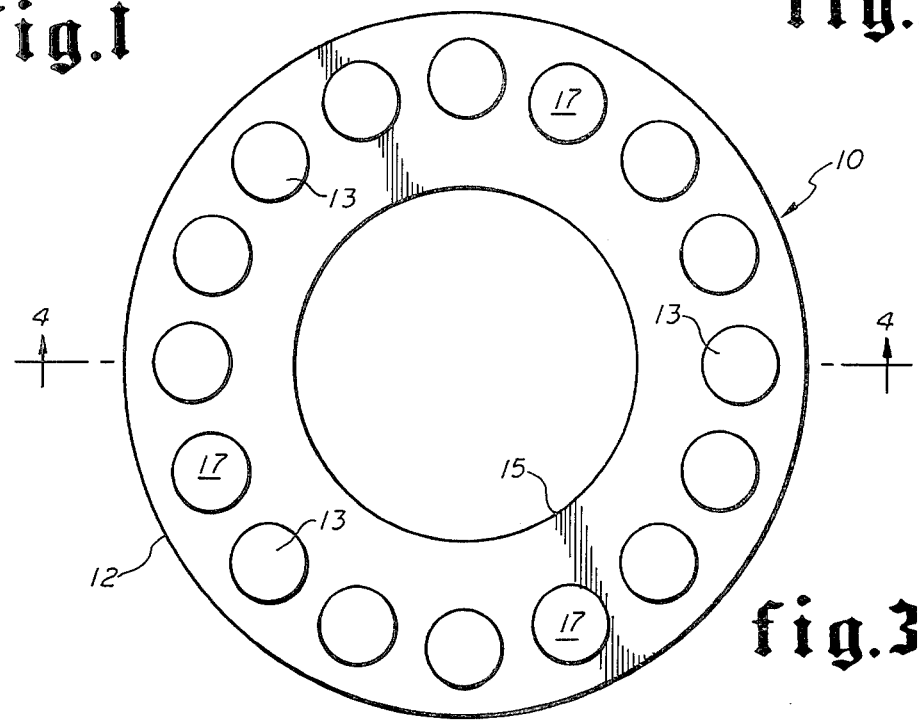
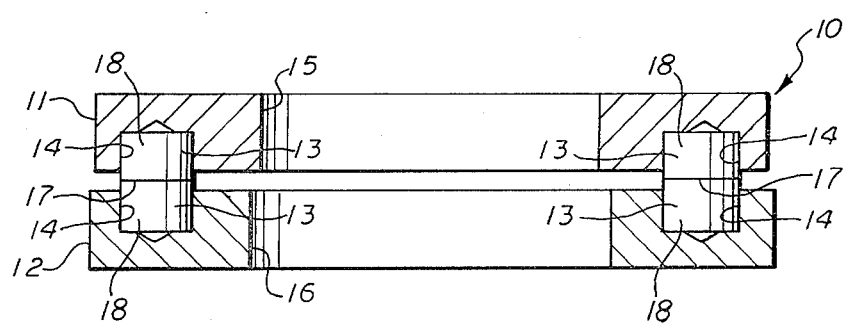
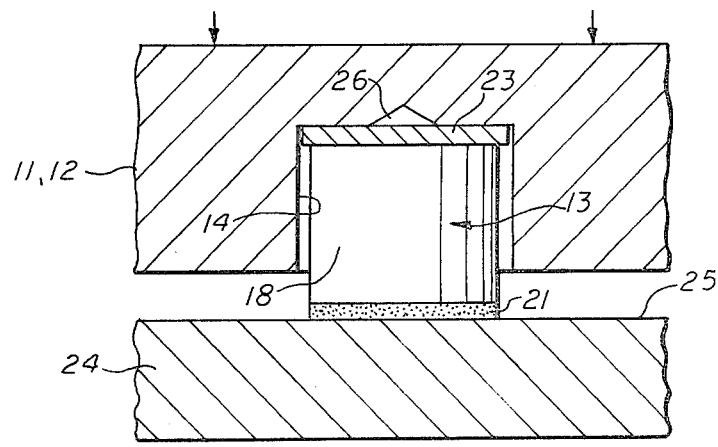

MANUFACTURE OF DIAMOND BEARINGS

BACKGROUND OF THE INVENTION

1. Field of the Invention

This invention relates to new and useful improvements in the manufacture of bearings and more particularly to processes for manufacturing diamond faced bearing assemblies.

2. Description of the Prior Art

It is well known to use diamond bits for earth drilling using natural or synthetic diamonds bonded to supporting metallic or carbide studs or slugs. There are several types of diamond bits known to the drilling industry. In one type, the diamonds are a very small size and randomly distributed in a supporting matrix. Another type contains diamonds of a larger size positioned on the surface of a drill shank in a predetermined pattern. Still another type involves the use of a cutter formed of a polycrystalline diamond supported on a sintered carbide support.

Some of the most recent publications dealing with diamond bits of advanced design are Rowley, et al. U.S. Pat. No. 4,073,354 and Rohde, et al. U.S. Pat. No. 4,098,363. An example of cutting inserts using polycrystalline diamond cutters and an illustration of a drill bit using such cutters, is found in Daniels, et al. U.S. Pat. No. 4,156,329.

The most comprehensive treatment of this subject in the literature is probably the chapter entitled STRATAPAX bits, pages 541-591 in ADVANCED DRILLING TECHNIQUES, by William C. Maurer, The Petroleum Publishing Company, 1421 South Sheridan Road, P.O. Box 1260, Tulsa, Okla., 74101, published in 1980. This reference illustrates and discusses in detail the development of the STRATAPAX diamond cutting elements by General Electric and gives several examples of commercial drill bits and prototypes using such cutting elements.

Polycrystalline diamond inserts have had extensive treatment in the literature as cutting elements for drill bits but there has been no suggestion of the use or application of diamond elements for friction bearings and particularly for bearings in turbodrills where the conditions of load and wear are severe.

In co-pending application, Ser. No. 306,290, filed Sept. 28, 1981, there is disclosed a turbodrill having longitudinal thrust bearings consisting of polycrystalline-diamond-faced carbide inserts used in combination with conventional radial bearings. The diamond bearing inserts are positioned in cylindrical recesses in an annular supporting plate or ring with the flat diamond faces lying substantially in a plane.

While the diamond bearing inserts are made with a high degree of dimensional precision, it has been difficult to drill holes or recesses in the supporting plate with sufficient precision to locate the bearing surfaces accurately in a single plane. This has resulted in minor variations in the amount of protrusion of the bearing inserts from the supporting plate which provides an irregular bearing surface. As a result, there has been a substantial need for a manufacturing technique which will produce a diamond bearing of this type with the bearing faces accurately located in a single plane.

SUMMARY OF THE INVENTION

One of the objects of this invention is to provide an improved method of manufacturing diamond faced bearings.

Another object of the invention is to provide an improved method of manufacturing diamond faced bearings with the bearing faces located in a common plane.

Another object of the invention is to provide an improved method of manufacturing diamond faced bearings consisting of a plurality of bearing inserts positioned in a supporting plate with diamond faces accurately positioned in a common plane.

Still another object of the invention is to provide an improved method of producing a bearing assembly consisting of a plurality of bearing inserts positioned in recesses in a supporting plate and held in place by metal surrounding the insert in each recess with the diamond faces of the bearings accurately located in a common plane.

Other objects of the invention will become apparent from time to time throughout the specification and claims as hereinafter related.

These and other apparent objects of the invention are accomplished by a method manufacture of diamond bearings consisting of a supporting plate/ring having a plurality of recesses equally spaced therearound with insert members consisting of hardmetal or carbide studs, with planar faces of polycrystalline diamond, positioned therein, in which the diamond bearing faces are made co-planar by placing metal pads, preferably of brazing metal, in the bottom of each recess before insertion of the bearing studs, placing the assembly with the bearing faces on a smooth planar support, heating the assembly to a temperature at which the metal pads soften or melt and allowing the metal pads to extrude around the bearing inserts. When the assembly has cooled, the bearing inserts have their diamond bearing faces locked in co-planar relation by the extruded metal from the metal pads.

BRIEF DESCRIPTION OF THE DRAWINGS

FIG. 1 is an isometric view of a diamond bearing insert used in the manufacture of diamond faced bearings according to the method of this invention.

FIG. 2 is a view in longitudinal central section of the diamond bearing insert shown in FIG. 1.

FIG. 3 is a plan view of a diamond bearing assembly produced in accordance with the method of this invention.

FIG. 4 is a sectional view taken on the line 4—4 of FIG. 3 showing the diamond bearing assembly.

FIG. 5 is an enlarged detail sectional view of the diamond bearing prior to completion of assembly and illustrating the method of assembly.

DESCRIPTION OF THE PREFERRED EMBODIMENT

Referring to the drawings and more particularly to FIGS. 3 and 4, there is shown a thrust bearing assembly designed for use in a turbodrill, as described in copending U.S. patent application Ser. No. 306,290 filed Sept. 28, 1981.

Thrust bearing 10 consists of a pair of annular bearing plates or rings 11 and 12 each having a plurality of bearing inserts 13 positioned in recesses 14 equally spaced thereon. The bearing supporting plates 11 and 12 are preferably of annular shape and have central openings 15 and 16 which permit the bearings to be supported between the rotor and the housing of a turbodrill or similar construction. The bearing faces 17 of bearing insert members 13 are positioned in abutting, bearing relationship as seen in FIG. 4.

Bearing inserts 13 are preferably diamond cutting elements, e.g. STRATAPAX cutter manufactured by General Electric Company and described in Daniels et al. U.S. Pat. No. 4,156,329, Rowley et al. U.S. Pat. No. 4,073,354, and in considerable detail in ADVANCED DRILLING TECHNIQUES by William C. Maurer. The STRATAPAX cutting elements, used herein as bearings, 13, each consists of a cylindrical supporting stud 18 of sintered carbide. Stud 18 is bevelled at the bottom as indicated at 19 and has a flat top end surface 20 which normal to the axis of the cylindrical stud. A disc shaped cutting or bearing element 21 is bonded on the top end surface 20, preferably by brazing or the like as indicated at 22.

Disc shaped bearing element 21 is a sintered carbide disc having a flat bearing surface 17 comprising polycrystalline diamond. Supporting studs 18 of bearing elements 13 are fitted into recesses 14 in bearing supporting plates 11 and 12 and have the diamond bearing faces 17 protruding therefrom to lie substantially in co-planar relationship. The faces 17 of diamond bearing inserts 13 must be accurately located in a single plane so that the abutting bearing faces of the bearing assemblies 11 and 12 meet smoothly in a common plane.

The dimensions of bearing insert members 13 can be formed accurately to tolerances of 0.0005 in. The depth of recesses 14 in supporting plates 11 and 12, however, can not be drilled nearly so accurately. As a result, while recesses 14 can be drilled with moderate accuracy, e.g. a tolerance of 0.001 in., the variation in depth is sufficient to produce a substantial variation in the protrusion of the diamond bearing faces 17 of bearing elements 13. It is therefore difficult to produce a structure in which the diamond bearing faces 17 are accurately positioned in a common plane if one relies solely on the accuracy of the depth of the supporting recesses 14.

The method of this invention makes possible the assembly of the composite bearing structure in a manner such that the diamond bearing faces 17 are accurately positioned in a common plane as is required to produce an efficient bearing structure. In carrying out this method of assembly, a metal pad 23 is placed in the bottom of each of the recesses 14 in supporting plate 11 or 12 prior to positioning the bearing inserts therein. The metal pads 23 are preferably of a fusible metal such as a brazing alloy, although higher melting metals can be used. The bearing inserts 13 are positioned with the supporting studs 18 in recesses 14 with the base end of the supporting studs in abutting relation with the fusible metal pads 23. The supporting studs 18 have a relatively tight fit in recesses 14 although a slightly exagerated clearance is indicated in the sectional view shown in FIG. 5.

The bearing assembly, consisting of supporting plate 11 or 12 with the fusible metal pads 23 in each of recesses 14 and the bearing inserts 13 assembled therein, is inverted and placed on a supporting member 24. Supporting member 24 is preferably a metal or a strong refractory material having a surface 25 which is accurately formed or ground into a perfectly planar surface which is not distorted with heat. The bearing assembly is allowed to rest on surface 25, as shown in FIG. 5, and the assembly and support are placed in an oven or other suitable heating means to raise the temperature to a level above the point at which the metal pads 23 soften or fuse. At this temperature, the metal pads 23 fuse and extrude into the space between the walls of recesses 14 and the exterior surface of supporting studs 18 for bearing insert members 13.

This flow of the metal or extrusion of the metal from metal pads 23 is under the influence of the weight of the supporting rings or plates 11 or 12 or may be under the influence of added, vertically applied force as indicated by the directional arrows at the top of the supporting plates in FIG. 5. As the metal pads 23 fuse and extrude or flow around supporting studs 18 the amount of flow differs slightly according to the extent of protrusion of the respective bearing inserts 13. As a result, the end faces 17 of bearing inserts 13 are allowed to settle against the planar supporting surface 25 of support member 24. When the bearing assembly is cooled, the metal from metal pads 23 which has flowed around the supporting studs 18 secures the bearing insert members 13 in position in the respective recesses 14 with the bearing faces 17 acurately located in a single plane.

The proceedure just described can be used with any suitable metal pad 23 which will soften and flow at an elevated temperature. It is preferred, however, that the metal pads 23 be of a brazing metal and that the space 26 at the base of the recesses 14 have a brazing flux supported therein which will assist the brazing metal 23 to braze the wall of supporting stud 18 to the wall of recess 14 in supporting plate or ring 11 or 12.

The process just described is effective to locate the bearing insert members 13 in recesses 14 and to secure the supporting studs therein by a brazing action with the diamond bearing faces 17 located acurately in a common plane, as defined by the supporting surface 25 of supporting member 24. This location of the diamond bearing faces 17 acurately in co-planar relationship insures that the bearing members consisting of the supporting rings or plates 11 and 12 and the various bearing insert members 13 will be capable of bearing against each other along a single bearing plane, as shown in FIG. 4. As a result, the novel process described produces a novel product consisting of the bearing assembly with the bearing insert members brazed in place with the bearing faces located in a common co-planar relation.

While this invention has been described fully and completely with special emphasis upon a single preferred embodiment, it should be understood that within the scope of the appended claims the invention may be practiced otherwise than as specifically described herein.

I claim:

1. In a method of producing diamond faced bearings comprising
   an annular supporting plate or ring having a plurality of recesses spaced uniformly therearound,
   a plurality of diamond faced insert members positioned one in each of said recesses,
   said insert members comprising a right cylindrical supporting stud of hardmetal having an end face of polycrystalline diamond,
   said recesses being of substantially uniform depth to position said diamond faces substantially in a common plane, the improvement which comprises
   placing a fusible metal pad in the bottom of each of said recesses prior to assembly, positioning said inserts with the studs in said recesses abutting said metal pads, inverting the assembled bearing and positioning said diamond faces on an accurately planar support, heating the assembled bearing while on said support to a temperature sufficient to cause said metal pads to extrude at least partially around said bearing insert studs, and cooling said bearing assembly so that said bearing inserts are supported with the diamond faces thereof accurately positioned in a co-planar relation.

2. A method according to claim 1 in which said bearing assembly is heated above the melting point of said metal pads.

3. A method according to claim 1 in which said extrusion of said metal pads is under the weight of only said supporting plate.

4. A method according to claim 1 in which said extrusion of said metal pads is under a predetermined additional force.

5. A method according to claim 1 in which said extrusion of said metal pads comprises the means for securing said bearing insert studs in place.

6. A method according to claim 1 in which said bearing inserts comprise right cylindrical studs of metal carbide having flat discs of polycrystalline diamond secured on the upper end thereof.

7. A method according to claim 1 in which said metal pads are of brazing metal.

8. A method according to claim 7 in which a brazing flux is placed in the bottom of each recess adjacent the metal brazing pad positioned therein.

9. A diamond faced bearing comprising an annular supporting plate or ring having a plurality of recesses spaced uniformly therearound, a plurality of diamond faced insert members positioned one in each of said recesses and protruding beyond the surface of said supporting plate or ring, said insert members each comprising a right cylindrical supporting stud of hardmetal having a unlapped flat planar end face of polycrystalline diamond, said recesses being of substantially uniform depth to position said unlapped diamond faces sustantially in a common plane spaced from the surface of said supporting plate or ring at the time of initial manufacture, a fusible metal in the bottom of each of said recesses extruded at least partially around said bearing insert studs and supporting the same with the unlapped diamond faces of said bearing inserts accurately positioned in a coplanar relation.

10. A bearing according to claim 9 in which said bearing inserts comprise right cylindrical studs of metal carbide having flat discs of polycrystalline diamond secured on the upper end thereof having unlapped faces spaced from the surface of said supporting plate or ring.

11. A diamond faced bearing having coplanar unlapped bearing faces assembled and produced by the method of claim 1, 2, 3, 4, 5, 6, 7 or 8.

* * * * *